United States Patent [19]

Jacaruso et al.

[11] Patent Number: 5,264,059
[45] Date of Patent: Nov. 23, 1993

[54] METHOD OF MAKING THERMOPLASTIC ADHESIVE STRIP FOR BONDING THERMOSET COMPOSITE STRUCTURES

[75] Inventors: Gary J. Jacaruso, Milford; Geoffrey C. Davis, Madison; Allen J. McIntire, Ansonia, all of Conn.

[73] Assignee: United Technologies Corporation, Hartford, Conn.

[21] Appl. No.: 860,474

[22] Filed: Mar. 30, 1992

Related U.S. Application Data

[62] Division of Ser. No. 628,245, Dec. 17, 1990, abandoned.

[51] Int. Cl.⁵ .............................................. B32B 3/00
[52] U.S. Cl. .................................. 156/148; 156/280; 156/298; 156/309.6; 156/178; 428/246; 428/286
[58] Field of Search ............... 156/298, 300, 72, 305, 156/309.6, 308.2, 311, 148, 176–178, 303.1, 280; 428/246, 247, 286, 284; 156/303.1, 280

[56] References Cited

U.S. PATENT DOCUMENTS

| | | | |
|---|---|---|---|
| 2,372,929 | 4/1945 | Blessing | 154/43 |
| 2,715,598 | 8/1955 | Rees et al. | 154/126 |
| 2,951,004 | 8/1960 | Martin et al. | 156/303.1 |
| 2,952,578 | 9/1960 | Carlson, Jr. | 154/126 |
| 3,239,403 | 3/1966 | Williams et al. | 156/273.9 |
| 3,864,186 | 2/1975 | Balla | 156/272 |
| 3,868,291 | 2/1975 | Benz et al. | 156/515 |
| 3,900,360 | 8/1975 | Leatherman | 156/272.4 |
| 3,985,604 | 10/1976 | Balla | 156/244 |
| 3,993,529 | 11/1976 | Farkas | 156/380 |
| 3,996,402 | 12/1976 | Sindt | 428/140 |
| 4,045,272 | 8/1977 | Lombardi | 156/380 |
| 4,110,506 | 8/1978 | Cottingham et al. | 428/138 |
| 4,268,338 | 5/1981 | Peterson | 156/251 |
| 4,313,777 | 2/1982 | Buckley et al. | 156/272 |
| 4,416,713 | 11/1983 | Brooks | 156/64 |
| 4,533,589 | 8/1985 | Sewell | 156/307.3 X |
| 4,556,439 | 12/1985 | Bannick et al. | 156/344 X |
| 4,560,428 | 12/1985 | Sherrick et al. | 156/273.9 |
| 4,704,509 | 11/1987 | Hilmersson et al. | 219/10.53 |
| 4,798,760 | 1/1989 | Diaz-Kotti | 428/247 |
| 4,908,088 | 3/1990 | Boyd et al. | 156/307.3 |
| 4,946,736 | 8/1990 | Sassa | 428/245 |
| 4,957,805 | 9/1990 | Biggs et al. | 156/308.2 X |
| 4,963,215 | 10/1990 | Ayers | 156/308.2 X |
| 5,077,116 | 12/1991 | Lefkowitz | 428/247 |
| 5,187,005 | 2/1993 | Stahle et al. | 428/246 |

FOREIGN PATENT DOCUMENTS

| | | |
|---|---|---|
| 179451 | 10/1985 | European Pat. Off. . |
| 2620648 | 9/1987 | France . |
| 1034738 | 7/1966 | United Kingdom . |

*Primary Examiner*—David A. Simmons
*Assistant Examiner*—Chester T. Barry
*Attorney, Agent, or Firm*—Terrance J. Radke

[57] ABSTRACT

A pair of thermoset composite structures (19,19') are bonded together by a pair of adhesive strips (10,10'). An adhesive strip (10) is comprised of a layer of semi-crystalline thermoplastic material (12), a layer of amorphous thermoplastic material (14), a layer of dry fiber reinforcement (16) partially embedded in the layer of amorphous thermoplastic material (14), and a layer of thermosetting resin (18) covering the exposed fibers of the dry fiber reinforcement. An adhesive strip is bonded to the bonding surface (20) of the structure (19) during the curing process for the thermoset composite structure. A resistance heating element is placed between the bonding surfaces (20,20'), the bonding surfaces (20,20') are pressed together, and electrical energy is passed through the heating element (24) to heat the joint and fuse the thermoplastic adhesive layers together. The dry fiber reinforcement (16) forms a mechanical lock between the cumulative layer of thermoplastic adhesive (32) and the thermosetting structures (19,19') to provide the bond strength.

3 Claims, 1 Drawing Sheet

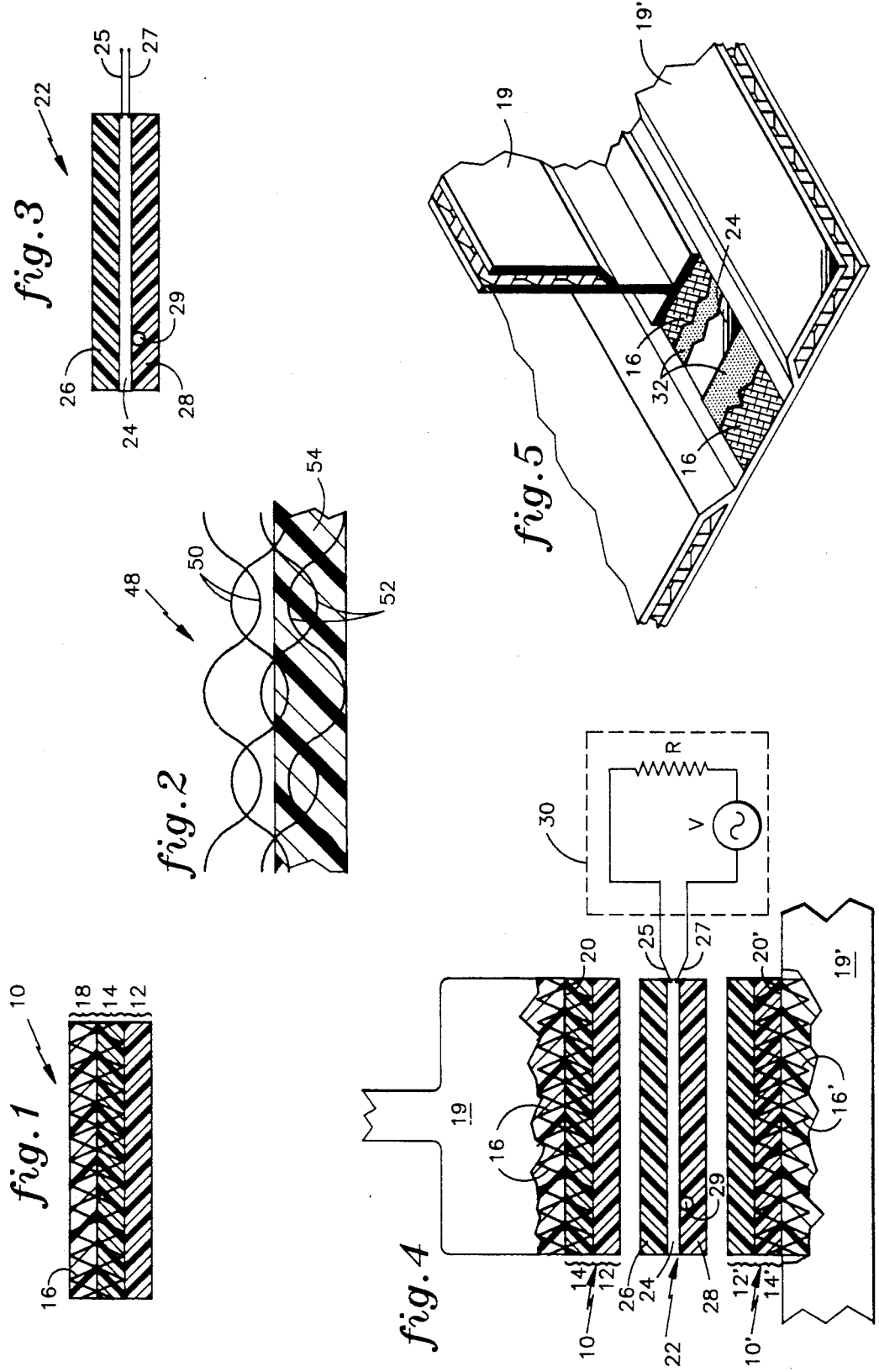

METHOD OF MAKING THERMOPLASTIC ADHESIVE STRIP FOR BONDING THERMOSET COMPOSITE STRUCTURES

This is a division of copending application Ser. No. 07/628,245, filed on Dec. 17, 1990, now abandoned.

DESCRIPTION

1. Technical Field

This invention relates to a method for bonding thermoset composite structures, and more particularly to the utilization of a thermoplastic adhesive layer to bond a pair of thermoset composite structures together.

2. Background Art

Thermoset composites have received widespread use in the aircraft industry as a structural material. This type of composite can provide a light weight structure of relatively high strength. To obtain a high strength structural bond with thermoset composites currently requires costly methods of bonding combined with mechanical fasteners.

One method of bonding thermoset composite structures together is to place thermoset resin film adhesive material between the surfaces to be bonded, followed by applying heat and pressure to the joint zone. This process is not very practical as it involves the application of relatively high heat (250°-350° F.) and pressure (25 psi. minimum) for extended periods of time (2 hours minimum at temperature). Thermal expansion can become a problem when large areas of structure are heated as required for this process. This is due to differing rates of thermal expansion of localized structure which causes thermal strain when the structure is cooled and can cause deformations. Another drawback is that thermoset adhesives can only be processed once and the bond is not reversible for repair or replacement of subsequently damaged sub-structure.

A second method currently used involves attaching together thermoset composite structure using mechanical fasteners combined with room temperature curing thermoset paste adhesive applied to joint surfaces. This method requires that the components being joined be pre-fitted and drilled for pilot holes, disassembled, cleaned and bond prepared. Adhesive is then applied to joint surfaces, the components are then reassembled, and the adhesive cured (usually 24 hours at room temperature). The next step is to drill and ream holes for each fastener and finally the fasteners are installed. This method is costly due to the use of mechanical fasteners and the labor intensive nature of the method.

An alternative to these processes is to use a film of thermoplastic adhesive between the thermoset composite structures being joined together. Since thermoplastic may be repeatedly melted and refused, the bonding process can be reversed as needed. Unfortunately, current thermoset resins will not chemically adhere with sufficient strength to suitable thermoplastic adhesive materials to meet aircraft requirements for joining structural components. Therefore this method is not practical in situations requiring high strength bonds.

DISCLOSURE OF INVENTION

An Object of the invention is an adhesive strip for reversibly joining together thermoset composite structures.

According to the present invention, thermoset composite structures are bonded together using thermoplastic adhesive strips which are comprised of a layer of suitable thermoplastic material, a ply of dry fiber reinforcement which is partially embedded in the layer of thermoplastic material, and the exposed dry fiber reinforcement is coated with a thermoset resin. The surfaces of uncured thermoset composite structures are prepared by positioning adhesive strips with the thermoset resin side towards the composite structures. The composite structures are then cured by conventional means. Subsequent to curing, the bonding surfaces (now coated with the thermoplastic adhesive strip) are pressed together and heated to fuse the joint. During this process sufficient heat is applied locally to melt and fuse the thermoplastic adhesive material without degrading the adjacent composite structure. The joint is allowed to cool using the composite structure as a heat sink.

The layer of dry fiber reinforcement, which bonds to both the thermoplastic adhesive material and the thermoset material (during the cure cycle), provides the means to mechanically lock the thermoset composite structure to the thermoplastic adhesive. This eliminates the need for a chemical bond to join the two components. The use of a thermoplastic material as an adhesive allows the bonding process to be easily and quickly reversed for repair or replacement of the thermoset structure.

Further, the heat applying means is a heating strip comprised of a resistance heating element embedded within two layers of thermoplastic adhesive material. The heating strip is placed between the bonding surfaces of the cured structures, pressure is applied to the joint and electrical energy, sufficient to heat the joint to above the melting temperature of the thermoplastic material, is passed through the foil for a duration sufficient to fuse the layers of thermoplastic adhesive material. The heating element remains within the joint after bonding and provides a convenient mechanism to reheat the joint and reverse the bonding process.

Although the invention described is particularly useful for bonding together thermoset composite structures on aircraft, it should be understood that the invention is equally well suited to any other application in which thermoset composite components are joined together in both structural and non-structural applications.

The foregoing and other objects, features and advantages of the present invention will become more apparent in light of the following detailed description of the exemplary embodiments thereof, as illustrated in the accompanying drawings.

BRIEF DESCRIPTION OF THE DRAWINGS

FIG. 1 is a sectional view of a thermoplastic adhesive strip.

FIG. 2 is a sectional view of a woven thermoplastic adhesive strip.

FIG. 3 is a sectional view of a heating strip.

FIG. 4 is a sectional view of a pair of bonding surfaces prepared for bonding.

FIG. 5 is a perspective view of a pair of thermoset composite structures after bonding, partially cut away to show the bonding layers.

BEST MODE FOR CARRYING OUT THE INVENTION

Referring now to FIG. 1, a thermoplastic adhesive strip 10 is comprised of a layer of semi-crystalline thermoplastic material 12, a layer of amorphous thermoplastic material 14, a layer of dry fiber reinforcement 16, and a layer of thermoset resin 18. The size of the strip 10 is dependant on the size of the structures to be bonded together. For illustrative purposes the thickness of the layer of semi-crystalline thermoplastic material is 0.004"; the thickness of the amorphous thermoplastic material is 0.003"; the thickness of the dry fiber reinforcement is 0.006'; and the thickness of the layer of thermoset resin is sufficient to coat the exposed layer of dry fiber reinforcement.

The fabrication of the adhesive strip involves several steps. First, the layers of semi-crystalline thermoplastic material 12 and the amorphous thermoplastic material 14 are initially fused together by raising the temperature of the two layers 12,14 above the melting point of the semi-crystalline thermoplastic material and pressing the layers of 12,14 together under approximately 5 to 20 psi. Since semi-crystalline thermoplastic material has a higher melting temperature than amorphous thermoplastic material, the two layers 12,14 become intimately fused.

A typical semi-crystalline thermoplastic material is polyetheretherketone (PEEK), which has a melting temperature of approximately 650° F., and a typical amorphous thermoplastic material is polyetherimide (PEI), which has a melting temperature of approximately 480° F. PEEK and PEI will be utilized in this description for illustrative purposes.

Second, the layer of dry fiber reinforcement 16 is embedded into the layer of PEI 14 by laying up the dry fiber reinforcement 16 onto the layer of PEI 14, applying pressure of approximately 5 to 15 psi, and heating the strip to a temperature above the melting temperature of PEI, but less than the melting temperature of PEEK. Since a temperature less than the melting temperature of PEEK is used, the layer of PEEK 12 acts as a barrier and prevents the layer of dry fiber reinforcement 16 from inserting beyond the PEI layer 14. In this way a portion of the dry fiber reinforcement 16, which is thicker than the layer of PEI 14, is bonded with the layer of PEI 14, and the remainder is exposed (i.e. not embedded). The last step is to coat ('wet-out') the exposed dry fiber reinforcement 16 with a thermoset resin 18.

An alternative method for fabricating a thermoplastic adhesive strip is shown in FIG. 2. A woven thermoplastic adhesive strip 48 is comprised of dry fiber reinforcement strands 50 woven together with commingled strands 52, which are formed by intimately fusing dry fiber reinforcement strands and spun thermoplastic filaments. The weaving produces a material which is predominantly dry fiber reinforcement on one side and commingled strands on the other side. The woven material is pressed onto a layer 54 of thermoplastic material, which is thinner than the woven material, with the side which is predominantly commingled strands adjacent to the layer of thermoplastic material, and sufficient heat is supplied to melt the layer of thermoplastic material After cooling, the dry fiber reinforcement strands are fused with and partially embedded in the layer of thermoplastic material. The exposed dry fiber strands are then coated with thermoset resin.

Another alternative (not shown) is to weave dry fiber reinforcement strands with thermoplastic filaments so as to produce a woven material with predominantly dry fiber reinforcement strands on one side and a combination of dry fiber reinforcement strands and thermoplastic filaments on the other side. As before, the woven material is pressed onto a layer of thermoplastic material which is thinner than the woven material, with the woven material which is a combination of dry fiber and thermoplastic filaments adjacent to the layer of thermoplastic material, and sufficient heat is supplied to melt the thermoplastic material. After cooling, the dry fiber reinforcement strands are fused with and partially embedded in the layer of thermoplastic material. The exposed dry fiber strands are then coated with thermoset resin.

An adhesive strip 10 is placed on an uncured thermoset composite structure 19. The adhesive strip is placed so that the layer of thermoset resin coated, dry fiber reinforcement 16 is adjacent to the composite structure 19. The structure 19, with adhesive strip 10 in place, is cured as normally required for the thermoset composite to produce a bonding surface 20. During cure the thermoset resin 18 will wet-out (impregnate) the exposed dry fiber reinforcement 16, which then becomes anchored to the thermoset structure 19. In this way the dry fiber reinforcement 16 forms a mechanical lock between the thermoset structure 19 and the thermoplastic adhesive strip 10, as shown in FIG. 4.

Referring now to FIG. 3, a heating element 22 is comprised of a resistance heater 24 embedded between two layers 26,28 of thermoplastic adhesive, in this case PEEK. The resistance heater 24 is assembled with a pair of electrical leads 25,27, which are electrically connected to the resistance heater 24, and at least one thermocouple 29 for temperature sensing. The heating element 22 is fabricated by fusing the resistance heater 24, assembled with leads 25,27 and thermocouple 29, between the two layers 26,28 of PEEK. The resistance heater 24 as shown is a thin metallic sheet, but may be fabricated from any conductive material and need not be in the form of a sheet. Other forms of electrical heating element materials which may be used are: etched foils, pierced and stretched foils, stamped elements, or wound wire serpentine.

A pair of cured structures 19,19' are bonded together by placing the heating element 22 between the prepared bonding surfaces 20,20' with the bonded adhesive strips 10,10', as shown in FIG. 4. Pressure of approximately 10 to 30 psi is applied to the joint and electrical energy is passed through the heating element by means of an electrical power supply 30. The joint is heated above the melting temperature of PEEK. This temperature is maintained for a sufficient time to fuse the thermoplastic adhesive in the joint.

For the adhesive strips as described above it is believed that the temperature of the joint should be raised above the melting temperature of PEEK (650° F.) in approximately one minute and maintained at that temperature for approximately 15 seconds. The rate of temperature increase and duration of the heating process is limited by the heat transfer rate of the joint and structure in order to avoid degradation of the adjacent thermoset composite structures 19,19'. Upon termination of the electrical energy supply, the joint is allowed to cool by using the bonded structures 19, 19' as heat sinks. The entire fusion cycle should take approximately two to three minutes.

In certain instances the availability of local structure to act as a heat sink may vary along the length of the joint. In these instances heat balancing may be required in order to ensure uniform heating and cooling of the joint during the bonding process.

After the cooling period is completed, the structures are bonded as shown in FIG. 5. The various layers of thermoplastic adhesive 32 are fused together and the dry fiber reinforcement 16 is embedded and encapsulated by the thermoplastic adhesive 32 and the thermoset resin of the thermoset composite structures 19,19'. The dry fiber reinforcement 16 provides a mechanical lock, between the thermoplastic adhesive 32 and the thermoset composite structures 19,19', which provides the bond strength. The heating element 24 remains in place and the electrical leads 25,27 remain attached to the heating element to allow for later reheating of the joint to permit repair or replacement of the bonded structures 19,19'.

The replacement procedure for a bonded structure would comprise the following steps. First, the joint would be heated by supplying electrical energy to the heating element 22 sufficient to heat the joint above the melting temperature of the thermoplastic adhesive The process would be maintained until the thermoplastic adhesive was melted, the joint could be separated, and the damaged structure could be removed. Second, the replacement structure, which would consist of a cured thermoset composite structure surfaced with thermoplastic adhesive in the joint zone (similar to the initial structure as shown in FIG. 4), is positioned in place of the removed structure Third, a new heating element, which is positioned in the joint, is heated by supplying electrical energy as discussed previously for bonding structures. The entire replacement process, assuming a cured structure and new heating element are readily available, may be completed in a matter of minutes.

Although certain thermoplastic materials (PEEK and PEI) are suggested as particularly useful for the specific embodiment illustrated in FIGS. 1 to 5, the selection of these materials is not limiting and it should be understood that other thermoplastic materials may be equally applicable to the present invention. In, addition the present invention may, if desired, be practiced by using a single type of thermoplastic material as long as a layer of partially exposed dry fiber reinforcement (not embedded in the thermoplastic material) is maintained for embedding in the thermoset composite structure during the lay-up and curing process.

Although the invention has been shown and described with respect to exemplary embodiments thereof, it should be understood by those skilled in the art that various changes, omissions and additions may be made therein and thereto, without departing from the spirit and the scope of the invention.

What is claimed is:

1. A method of forming an adhesive strip for reversibly bonding a first thermoset composite structure to a second thermoset composite structure, the adhesive strip including a dry fiber reinforcement layer, a layer of thermoset resin, and a layer of thermoplastic material, the method including the steps of:

intimately fusing together a layer of semicrystalline thermoplastic material and a layer of amorphous thermoplastic material to form the layer of thermoplastic material;

pressing the dry fiber reinforcement layer onto the layer of amorphous thermoplastic material;

applying heat to melt the layer of amorphous thermoplastic material, but not the layer of semicrystalline thermoplastic material so that the dry fiber reinforcement layer is partially embedded in the amorphous thermoplastic material layer wherein a portion of the pressed dry fiber reinforcement layer is exposed;

cooling the layer of thermoplastic material having the dry fiber reinforcement layer partially embedded therein; and coating the exposed portion of the partially embedded dry fiber reinforcement layer with the thermoset resin.

2. A method of forming an adhesive strip for reversibly bonding a first thermoset composite structure to a second thermoset composite structure, the adhesive strip including a dry fiber reinforcement layer, a layer of thermoset resin, and a layer of thermoplastic material, the method including the steps of:

intimately combining dry fiber reinforcement strands with spun thermoplastic filaments to form commingled strands;

weaving the commingled stands with dry fiber reinforcement strands to form a woven material wherein one side thereof is predominantly the dry fiber reinforcement strands and the other side thereof is the commingled strands, the dry fiber reinforcement side of the woven material defining the dry fiber reinforcement layer;

pressing the woven material onto the layer of thermoplastic material so that the commingled strands side thereof is adjacent the layer of thermoplastic material;

applying heat to melt the thermoplastic material layer to partially embed the woven material therein wherein a portion of the dry fiber reinforcement side thereof is exposed;

cooling the layer of thermoplastic material having the woven material partially embedded therein; and coating the exposed portion of the partially embedded woven material with thermoset resin.

3. A method of forming an adhesive strip for reversibly bonding a first thermoset composite structure to a second thermoset composite structure, the adhesive strip including a dry fiber reinforcement layer, a layer of thermoset resin, and a layer of thermoplastic material, the method including the steps of:

weaving strands of dry fiber reinforcement and strands of spun thermoplastic filaments to form a woven material wherein one side thereof is predominantly the dry fiber reinforcement strands and the other side thereof is a combination of the spun thermoplastic filament strands and the dry fiber reinforcement strands, the dry fiber reinforcement side of the woven material defining the dry fiber reinforcement layer;

pressing the woven material onto the layer of thermoplastic material so that the combination of dry fiber reinforcement strands and the spun thermoplastic filament strands are adjacent to the layer of thermoplastic material;

applying heat to melt the thermoplastic material layer to partially embed the woven material therein wherein a portion of the dry fiber reinforcement side is exposed;

cooling the layer of thermoplastic material having the woven material partially embedded therein; and coating the exposed portion of the partially embedded woven material with thermoset resin.

* * * * *